May 22, 1956 M. V. COVINGTON 2,746,379
FRUIT JUICE EXTRACTOR
Filed Nov. 10, 1952

INVENTOR
MABEL V. COVINGTON
BY
ATTORNEY

United States Patent Office 2,746,379
Patented May 22, 1956

2,746,379
FRUIT JUICE EXTRACTOR
Mabel V. Covington, Nashville, Tenn.
Application November 10, 1952, Serial No. 319,738
1 Claim. (Cl. 100—108)

The present invention relates to a juice extractor and more particularly to improved means for sucking or drawing juice from citrus fruit and the like.

An important object is to provide a juice extractor with means arranged to be inserted into the citrus fruit such as an orange, lemon or the like, so that upon squeezing the fruit the juice may be sucked therefrom without getting on the hands of the user and without the lips being brought into direct contact with the natural acids of the rind of the fruit.

A further object consists in providing a juice extractor with means including spaced retaining or sealing means which when the extractor is inserted in the fruit are positioned on opposite sides of the rind so as to provide a seal for preventing the escape of the juice at the point of engagement of the extractor with the rind.

A further object is to provide a juice extractor having means for withdrawing the juice from the fruit including a spiral or threaded portion which when screwed into the fruit is maintained in a firm gripping engagement therewith. Additionally the lower edge of the threads are serrated so as to rip open the membranes of the fruit such as an orange or the like, as the extractor is progressively inserted into the fruit. Additionally the top surface of the thread is convexly curved so as to allow the extractor to be progressively inserted into the fruit without building up pressure which would normally split the fruit at the top adjacent the point of insertion of the extractor therein. Thus simple, efficient, and sanitary means are provided for drawing out substantially all of the juice from a citrus fruit without wasting any of the juice or soiling the hands of the user.

Referring to the drawing in which is shown a preferred embodiment of the invention:

Figure 1:
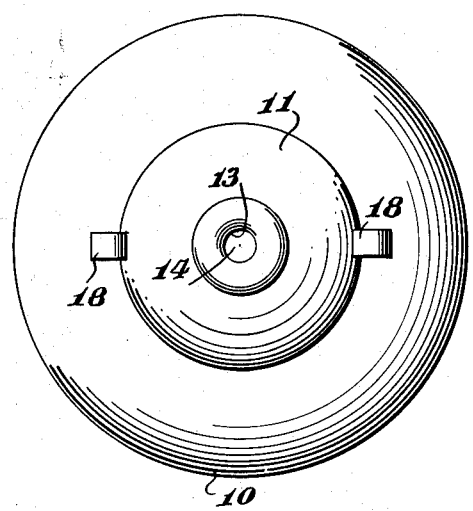
Figure 1 is a plan view of a juice extractor constructed in accordance with the present invention.

Referring to the drawing 10 indicates a citrus fruit such as an orange, lemon or the like. In order that a maximum yield of the juice may be obtained by sucking the same from the fruit there is provided a juice extractor 11 which may be made of any suitable, durable and light material, such as plastic or the like. The extractor 11 preferably has an elongated body 12 (Figure 3) provided with an axial passage 13 extending outwardly to the upper end 14 and terminating short of the lower closed end 15. The passage 13 is preferably tapered and diverges upwardly from the lower end 15 to the opposite opened end 14. An annular flange 16 extends outwardly from the body adjacent the upper end 14 and is preferably curved so as to have a concave inner surface 17 that conforms with the curvature of the rind of the citrus fruit 10. The flange 16 may also be provided with diametrically disposed lugs 18 which facilitate the manipulation of the extractor. The body 12 below the flange 16 is preferably tapered so as to converge toward the lower end 15, and has a spiral or screw threaded portion 18' the threads of which are similarly tapered. The upper end of the screw thread portion 18' is formed with a flat circular surface 19 that is spaced from the flange 16 so as to provide an annular recess or slot 20 (Figure 3) for receiving a portion 21 of the rind of the fruit 10 when the extractor is inserted into its operative position. The rim portion of the threads 18' has its upper surface curved outwardly and downwardly as at 22 so as to allow the pressure developing when the extractor is inserted into the fruit 10, to drop off or be decreased so as not to exert sufficient pressure on the pulp which would normally build up over the threads and cause the orange to split at the point of entry of the extractor therewith. The body 11 has vertically spaced radial holes or ports 23 which extend upwardly from the lower end 15 a predetermined distance or to a point about halfway up the length of the body and of such size as to permit the free flow of the juices into the passage 13 without allowing the entrance of seeds or pulp. The lower end portion of the thread 18' preferably has its edge serrated as at 24 which functions to tear the membranes of the orange or other citrus fruit as the extractor is progressively inserted therein. The outer or upper end 14 of the body 11 is shaped to form a sucking spout 25 for withdrawing the juice from the fruit during the operation of the device. The invention is particularly intended to be used by children so as to allow them to easily extract the juice from an orange, lemon, grapefruit or the like without soiling their hands or having their lips come in contact with the rind of the fruit. However it may also be used for extracting the juice upon insertion of the extractor into the fruit and without the use of suction.

Figure 2:
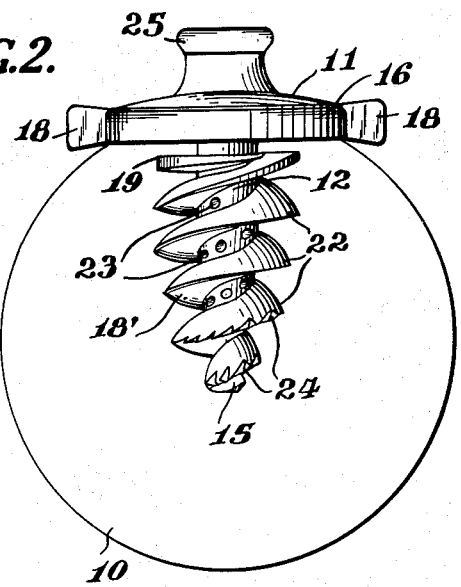
Figure 2 is a side view of the extractor showing the position it assumes when inserted in a citrus fruit.
Figure 3:
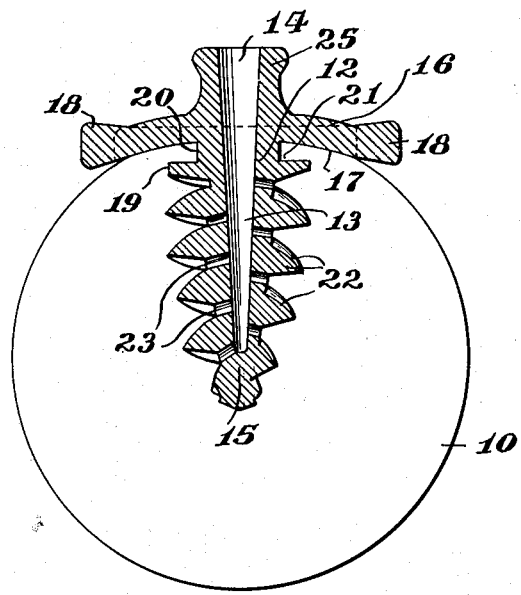
Figure 3 is a vertical sectional view of the extractor shown in Figure 2.
Figure 4:
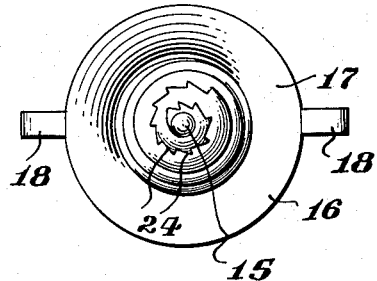
Figure 4 is a bottom plan view of the extractor.

In operation a small conical piece is cut from the stem end of the orange and the extractor is then inserted and screwed so as to extrude the juice as shown in Figure 2. During this operation the serrated edge 24 on the lower or inner part of the body rips or tears open the membranes of the orange as the insertion of the extractor progresses. By manually squeezing the orange and sucking on the spout 25 maximum yield of the juice from the orange is obtained. The lugs 18 tend to facilitate the insertion of the extractor into the orange. It will be seen that when the parts are in the position as shown in Figure 3, the concave inner surface 17 of the flange 16 co-acts with the flat portion 19 of the screw thread to firmly maintain the portion 21 of the rind in sealing engagement with the flange so as to prevent the escape of juice at this point and insure proper suction upon withdrawal of the juice through the extractor. Additionally, the flange 16 serves to protect the lips of the user from being brought into direct contact with the orange. The convexly curved upper surface or pitch 22 of the threads allows the extractor to be progressively advanced downward or into the orange without building up pressure that would normally split the orange at the point of contact of the rind with the extractor. The serrated edge 24 on the lower edge portion of the screw functions to rip open the membranes of the orange as the extractor is progressively inserted so as to free the juices and obtain maximum yield from the orange. The lower end 15 of the body is closed so as to prevent puncture of the adjacent end of the orange from the inside when the extractor is applied. Further this closed end has no sharp edges so that the extractor may be safely used by children without risk of cutting themselves or used by them as a dangerous weapon when playing.

Thus means are provided for efficiently and economically extracting practically all of the juice from succulent fruits, vegetables and the like, in a clean and sanitary manner and without danger of contaminating the juice or soiling the hands of the user. Further the extractor is of light, durable material and can be easily cleaned or washed at a minimum expenditure of time and effort. It will be understood that the form of the invention shown and described is merely illustrative of a preferred embodiment and such changes may be made as come within the purview of the following claim.

I claim:

A juice extractor for citrus fruit including an elongated body having a closed lower end and an axial passage extending to the upper end thereof, said upper end being shaped to provide a discharge spout, said body having an annular flange extending outwardly and laterally therefrom adjacent its upper end, said body below said flange converging downwardly toward the lower end thereof and having a spiral tapered screw thread spaced from said flange to provide a space for receiving the rind of a citrus fruit when the extractor is inserted into the citrus fruit, the upper end of said thread terminating in a flat circular portion of smaller diameter than said flange, said flange having a concave inner surface coacting with said flat circular portion to provide a tight sealing engagement with the rind of the fruit in said space, said screw thread extending to the lower end of the body and having a convexedly curved upper surface to reduce the pressure on the pulp which would normally be built up over the thread and cause the fruit to split at the point of insertion of the extractor with the fruit, the lower end portion of the thread having a serrated edge, and said body having transverse holes communicating with said passages for withdrawing the juice from the fruit when the extractor is inserted therein.

References Cited in the file of this patent

UNITED STATES PATENTS

| | | |
|---|---|---|
| 74,489 | Bidwell | Feb. 18, 1868 |
| 225,762 | Pierce | Mar. 23, 1880 |
| 1,747,957 | Silveus | Feb. 18, 1930 |
| 1,965,910 | Schiller | July 10, 1934 |
| 2,200,227 | Olson | May 7, 1940 |

FOREIGN PATENTS

| | | |
|---|---|---|
| 234,029 | Germany | Apr. 28, 1911 |
| 240,955 | Switzerland | July 16, 1946 |
| 250,818 | Great Britain | Apr. 22, 1926 |
| 548,411 | Germany | Apr. 15, 1932 |
| 660,153 | Germany | May 18, 1938 |